United States Patent
Preston

(10) Patent No.: US 7,300,019 B2
(45) Date of Patent: *Nov. 27, 2007

(54) MULTIMODAL, DEPLOYABLE VEHICLE

(75) Inventor: Daniel J. Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/436,241

(22) Filed: May 18, 2006

(65) Prior Publication Data

US 2007/0252030 A1   Nov. 1, 2007

Related U.S. Application Data

(63) Continuation of application No. 10/315,686, filed on Dec. 9, 2002, now Pat. No. 7,066,426.

(51) Int. Cl.
*B64C 37/00* (2006.01)
(52) U.S. Cl. .......................................... 244/2; 244/139
(58) Field of Classification Search .................... 244/2, 244/13, 138 R, 139, 140, 145, 146, 152
See application file for complete search history.

(56) References Cited

U.S. PATENT DOCUMENTS

| | | | | |
|---|---|---|---|---|
| 2,404,673 A | * | 7/1946 | Volf | 280/30 |
| 3,140,842 A | * | 7/1964 | Craigo et al. | 244/46 |
| 4,634,080 A | * | 1/1987 | McNally | 244/13 |
| 4,657,207 A | * | 4/1987 | Poling | 244/21 |
| 4,934,630 A | * | 6/1990 | Snyder | 244/13 |
| 5,078,335 A | * | 1/1992 | David | 244/2 |
| 5,678,784 A | * | 10/1997 | Marshall et al. | 244/2 |
| 5,893,536 A | * | 4/1999 | Lee et al. | 244/149 |
| 6,343,244 B1 | | 1/2002 | Yoneda et al. | |
| 6,622,968 B1 | * | 9/2003 | St. Clair et al. | 244/138 R |
| 7,066,426 B2 | | 6/2006 | Preston | |

FOREIGN PATENT DOCUMENTS

FR            1341861      * 12/1962      ............. 244/138 R

\* cited by examiner

*Primary Examiner*—Rob Swiatek
(74) *Attorney, Agent, or Firm*—Bourque & Associates

(57) ABSTRACT

A multimodal vehicle includes a ground based vehicle with an attached high-capacity airfoil parachute for deployment. The ground based vehicle includes a drive system for use on either land, water or both. Furthermore, the ground based vehicle is sized and dimensioned for transport of multiple vehicles in a cargo plane. The high-capacity airfoil parachute allows high-altitude deployment of the multimodal vehicle. The risers to the parachute may be adjusted for powered parachute flight rather than free fall flight. The ground based vehicle may include a propeller for powered flight.

15 Claims, 1 Drawing Sheet

MULTIMODAL, DEPLOYABLE VEHICLE

CROSS-REFERENCE TO RELATED APPLICATIONS

This application is a continuation of U.S. patent application Ser. No. 10/315,686 filed on Dec. 9, 2002 now U.S. Pat. No. 7,066,426 B2 entitled "MULTIMODAL, DEPLOYABLE VEHICLE", which claims the benefit of U.S. Provisional Application No. 60/340,959, filed Dec. 7, 2001.

TECHNICAL FIELD

The invention relates to generally to multimodal vehicle operable in the air and on the ground or water. More particularly, it relates to a multimodal vehicle having a specially designed parachute operable as a deployable free fall parachute and as a powered parachute.

BACKGROUND INFORMATION

Modern warfare is characterized by mechanization and speed. Personnel, equipment, armament, supplies and materials need to be moved quickly to locations where they can be best used. The pace of warfare further requires quick movements of personnel and supplies during engagements. Thus, mechanized artillery, tanks and armed personnel carriers have become increasingly important in modern warfare. However, military actions have also become increasingly global, requiring rapid movement of men and supplies anywhere around the world. The weight and bulk of military transport vehicles makes them inconsistent with rapid deployment in large numbers throughout the world. Shipment by boat or rail is slow. Air transport of vehicles, while faster, is limited by the carrying capacity of the aircraft and the locations of suitable landing locations. Therefore, a need exists for versatile military vehicles which can be rapidly deployed to locations throughout the world.

Existing rapid deployable military vehicles are currently transported to a military operation via a cargo planes. Due to their size, cargo planes require large, strong runways. Thus, the cargo planes are forced to land at facilities which may be distant from the desired locations for the vehicles. After a cargo plane lands at a suitable location, hopefully near the front lines of the campaign, the military vehicles have to be driven to where they can be used in the campaign for various purposes. Considerable time, resources and supplies are used in transporting the vehicles from the landing locations to the front lines for deployment. In order to move the vehicles to another location, they have to be driven to the new location or driven back to the cargo plane landing site to be airlifted to another landing site. Accordingly, a need exists for a rapidly deployable, fast attack military vehicle which can be deployed from an aircraft at high altitudes. A need also exists for a rapidly deployable, fast attack military vehicle that can be rapidly redeployed by allowing it to take off and fly from the ground.

SUMMARY

The disadvantages of the prior art are substantially overcome by the multimodal military vehicle of the present invention. The multimodal vehicle of the present invention includes a dune buggy like design for ground movement and a deployable ram air parachute, and a source of propulsion for flying, i.e., a ducted fan or propeller. The vehicle design should be appropriate to function as an ground attack vehicle and may include multiple wheels or tracks, armaments, personnel capacity, and other features of current light assault military vehicles. According to another aspect of the invention, the vehicle may include capabilities for water or amphibious operation. According to another aspect of the invention, vehicle is protected by ballistic fabric panels with a quick release mechanism. Such mechanism is necessary to allow fast egress of any passengers during flight in the event of a malfunction.

According to another aspect, the present invention includes a vehicle with a ram air parachute that can be changed for efficient operation both as a free fall deployed chute or powered parachute operation. This is accomplished by changing the trim of the canopy via the risers.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
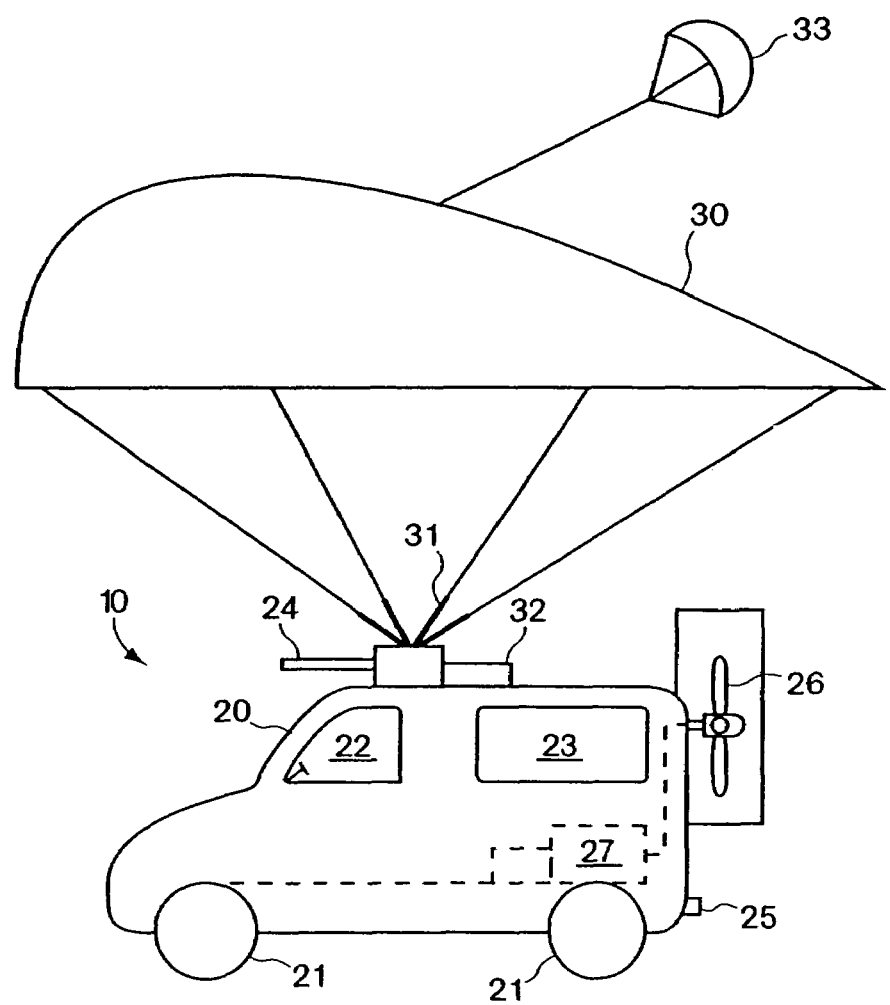
FIG. 1 is a side view of a multimodal vehicle according to an embodiment of the present invention.

The all terrain, fast attack, military vehicle 10 according to the present invention includes a lightweight vehicle 20 with an integrated air propulsion device and a parachute 30. The lightweight vehicle 20 may be of any type desirable for military operation, preferably a space frame design dune buggy or "fast attack vehicle". It may include driving mechanisms for all-terrain operation, as well as sea and air propulsion. For land operation, the vehicle 20 can include multiple wheels 21 with an appropriate drive train and suspension for all-terrain operation. It may be two-wheel or preferably four-wheel drive. It may also include more than four wheels as known in the art of military vehicle design. Alternatively, the vehicle 20 can include a track type propulsion system (not shown), similar to a tank. The vehicle 20 includes one or more personnel compartments 22, 23. At least one personnel compartment 22 accommodates the operator of the vehicle. Other compartments 23 may be used for transport and deployment of personnel to locations for engagement. Alternatively, the vehicle may be used for transport of supplies. The vehicle can include fixed armament 24, such as machine guns or light artillery for use in an engagement. The armament may include machine guns mounted on various points on the vehicle including, but not limited to, the front, the roof, and the rear of the vehicle. The frame of the vehicle 20 is designed such that multiple vehicles 20 can be stacked horizontally and vertically in the hold of a cargo plane. The vehicle's engine 27 is connected to both the ground vehicle transmission and to the ducted fan via a second clutch.

In another embodiment of the present invention, the vehicle 20 includes a jet pump 25, propeller (not shown) or other drive mechanism for use in water operations. The vehicle 20 may include both land and water drive mechanism for amphibious operations. The water pump to provide jet-boat propulsion can be connected to the engine through a separate clutch or geared with the action of the land transportation means. When a water propulsion system is included, the frame and design of the vehicle must accommodate amphibious operation.

The fast attack vehicle 10 of the present invention includes a ram air parachute 30 of known designs. Specifically, the parachute 30 is a ram air, deployable canopy providing sufficient lift to support the vehicle during gliding or powered flight. The parachute 30 includes a specially designed rigging harness 31 which allows changes in the length of the risers attaching the vehicle to the canopy. The risers can be automatically adjusted to change the canopy from a front edge down position, used in free fall deployment, to a front edge up position used for powered parachute operation. The vehicle 20 includes a propeller 26 or other system for driving the vehicle during flight. The propeller 26 is preferably driven by the same motor that operates the drive wheels, being attached to a take-off clutch for independent operation. A storage compartment 32 on the roof of the vehicle 20 stores the parachute 30 for deployment.

The fast attack vehicle 20 of the present invention can be directly deployed from an aircraft to any desired ground location. The vehicle is dropped, as with cargo, from a cargo aircraft as sufficient altitude for proper operation. A drogue parachute 33 is used to open the main canopy from the specialized storage compartment 32. The harness 31 is set with the front edge down for free fall deployment. Upon deployment, the canopy fills with air and forms a airfoil shape. The canopy functions as a wing providing steerable control during descent. When the vehicle is air dropped from a cargo aircraft, it may be dropped with personnel on board and manually flown. Alternatively, a flight computer may be included to control flight during drop either automatically or by remote control. The parachute, and thus the vehicle, are steered by either shifting the weight of the vehicle relative to the parachute, or by using steering lines of the parachute with actuators. Such line actuation and or weight shift to be performed with actuators, electric motor, pneumatics, etc. Thus, the vehicle can be dropped and steered to any desired location.

The suspension system of the vehicle may also be used to absorb some or substantially all the shock from landing, in the event of a poorly piloted landing. In the event of a crash landing, inflatable air beams integrated into the vehicle's structure may be deployed for absorbing the shock of the crash. Such air beams may be inflated as current automotive air bags (i.e., using a chemical charge), but are preferably inflated using pressurized gas, inflated and deflated upon impact, with controlled conductance. This is because a crash landing with the vehicle according to the present invention will, in most situations under a fast gliding wing, not be one impact, but several (e.g., like a rock skipping across a pond).

Once the vehicle is on the ground, the parachute is repacked in the specialized compartment 32 for later deployment. Alternatively, depending upon the location of the drop and the position of the front lines, the parachute may be cut free and left or later retrieved, as necessary. In order to move the vehicle to another location, the parachute 30 is removed from the specialized compartment 32 and laid behind the vehicle. The harness 31 is set for a front edge up position for use as a powered parachute. The vehicle is driven forward by the air propeller which will inflate the parachute into an airfoil. The vehicle will lift off the ground and can be flown to another location. Again, the parachute is steered by shifting weight of the vehicle or by actuating steering lines to the canopy. Additionally, during free fall, the air propeller 26 may be engaged for powered flight. Thus, during deployment, the drop location can be changed as appropriate to account for changing conditions and be further away than could be reached by just gliding.

Figure 2:
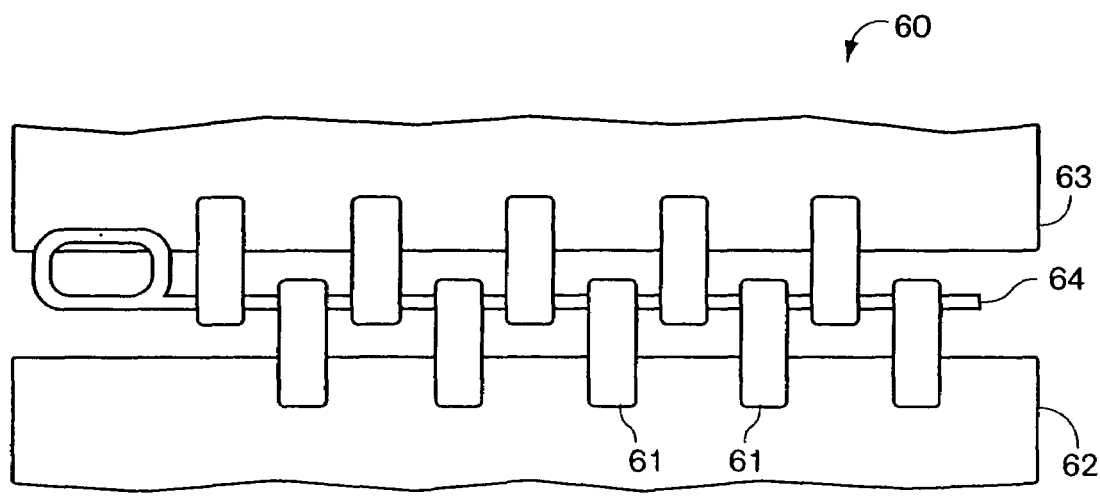
FIG. 2 is illustrates a quick release mechanism for removable ballistic protection fabric panels according to an embodiment of the present invention.

Preferably, the vehicle 20 includes light weight armor such as a Kevlar ballistic cloth to protect the passengers and cargo. To allow quick egress by passengers in the event of problems, a special release mechanism 60 is included. The special release mechanism 60 is illustrated in FIG. 2. A plurality of loops 61 are provided on the edges 62, 63 of the Kevlar bag. A cable 64 passes through the loops 61 to hold the edges 62, 63 together. For a quick release, the cable is pulled from the loops 61. With the cable removed, the edges will separate and the armor cloth will open or fall off the vehicle. The passengers can then exit the compartment with personal parachute systems.

While the present inventions have been described with a certain degree of particularity, it is obvious from the foregoing detailed description that one skilled in the art may make one or more modifications which are suggested by the above descriptions of the novel embodiments.

The invention claimed is:

1. A multimodal vehicle comprising:
   a ground operable vehicle having an air propulsion source dischargeable from an aircraft in-flight;
   a multimodal ram air parachute operable in one free fall mode as a free fall parachute and in another powered parachute mode as a powered parachute attached to an upper portion of the ground operable vehicle deployable as a free fall parachute in said free fall mode following discharge of the ground operable vehicle from the aircraft for controlled descent of the ground operable vehicle to a target location and redeployable upon landing of the ground operable vehicle at the target location as a powered parachute in said powered parachute mode for controlled takeoff, flight and landing of the ground operable vehicle using said air propulsion source; and
   a reefing mechanism operatively connected to said multimodal ram air parachute, said reefing mechanism controlling the rate at which said multimodal ram air parachute opens to prevent damage to said multimodal ram air parachute.

2. The multimodal vehicle according to claim 1, mechanism attached to the wheels for operation on land.

3. The multimodal vehicle according to claim 1, wherein the ground operable vehicle includes a drive mechanism for operation on water.

4. The multimodal vehicle according to claim 1, wherein the ground operable vehicle includes armament.

5. The multimodal vehicle according to claim 1, wherein the ram air parachute is packable.

6. The multimodal vehicle according to claim 1, wherein said source of air propulsion includes a propeller attached to a drive mechanism of the ground vehicle for powered flight.

7. The multimodal vehicle according to claim 1 further comprising: control means operable in the ground vehicle for controlling direction during flight.

8. The multimodal vehicle according to claim 7, wherein the control means includes means for shifting the weight of the vehicle relative to the parachute.

9. The multimodal vehicle according to claim 7, wherein the control means includes steering lines attached to the parachute.

10. A method of operating a multimodal vehicle including a ground operable vehicle having an air propulsion source and a multimodal ram air parachute operable in one free fall mode as a free fall parachute and in another powered parachute mode as a powered parachute that is attached to the ground operable vehicle, the method including the steps of:
- discharging the ground operable vehicle from a delivery aircraft;
- deploying the multimodal parachute for operation in said free fall mode as a free fall parachute;
- steering the ground operable vehicle to a target location during descent using the multimodal parachute in said free fall mode;
- landing the ground operable vehicle on the ground using the multimodal parachute in said free fall mode;
- redeploying upon landing the multimodal parachute for operation in said powered parachute mode as a powered parachute; and
- causing the ground operable vehicle to takeoff, fly and land using the multimodal parachute in said powered parachute mode and said air propulsion source.

11. The method of operating the multimodal vehicle according to claim 10, further comprising the step of driving the ground vehicle while on the ground.

12. A multimodal vehicle comprising:
- a ground operable vehicle having an air propulsion source and a ground propulsion source and dischargeable from an aircraft in-flight; and
- a multimodal ram air parachute, operable in one free fall mode as a free fall parachute and in another powered parachute mode as a powered parachute, attached to an upper portion of the ground operable vehicle and deployable as a free fall parachute in said free fall mode following discharge of the ground operable vehicle from the aircraft for controlled descent of the ground operable vehicle to a target location and redeployable upon landing of the ground operable vehicle at the target location as a powered parachute in said powered parachute mode, for controlled takeoff, flight and landing of the ground operable vehicle using said air propulsion source.

13. A multimodal vehicle comprising:
- a ground operable vehicle dischargeable from an aircraft in-flight;
- said ground operable vehicle dischargeable from said aircraft in-flight including a motive source, and means coupled to said motive source for providing motive power selectively to either a ground locomotion member carried by said ground operable vehicle or to an air propulsion source carried by said ground operable vehicle; and
- a ram air parachute, operatively attached to an upper portion of the ground operable vehicle, for providing controlled descent of the ground operable vehicle to a target location when discharged from said aircraft in-flight.

14. A multimodal vehicle comprising:
- a vehicle having an air propulsion source and a ground propulsion source;
- a multimodal ram air parachute;
- a plurality of risers connecting said multimodal ram air parachute to said vehicle; and
- control means for selecting from a free fall mode, a powered parachute mode, and a powered ground mode, whereby during said free fall mode said control means deploys said multimodal ram air parachute for controlling a descent of said multimodal vehicle after discharge from an aircraft and controls a rate at which said multimodal ram air parachute opens after discharge from said aircraft for preventing damage to said multimodal ram air parachute, during said powered parachute mode said control means deploys said multimodal ram air parachute and engages said air propulsion source for providing flight, and during said powered ground mode said control means activates said ground propulsion source for providing land propulsion.

15. A multimodal vehicle comprising:
- a vehicle having an air propulsion source and a ground propulsion source;
- a multimodal ram air parachute system including a ram air parachute, a plurality of risers connecting said multimodal ram air parachute to said vehicle, and a reefing mechanism for controlling a rate at which said ram air parachute opens to prevent damage to said ram air parachute after discharge from an aircraft, wherein said multimodal ram air parachute system includes substantially only non-rigid structures when in a non-deployed state such that said multimodal ram air parachute system can be packed; and
- control means for selecting from a free fall mode, a powered parachute mode, and a powered ground mode, whereby during said free fall mode said control means deploys said ram air parachute for controlling a descent of said multimodal vehicle after discharge from an aircraft and said reefing mechanism controls said rate at which said ram air parachute opens after discharge from said aircraft, during said powered parachute mode said control means deploys said ram air parachute and engages said air propulsion source for providing powered flight, and during said powered ground mode said control means activates said ground propulsion source for providing land propulsion.

* * * * *